(No Model.)
R. C. ANDERSEN.
APPARATUS FOR COOKING BY STEAM.
No. 474,620. Patented May 10, 1892.
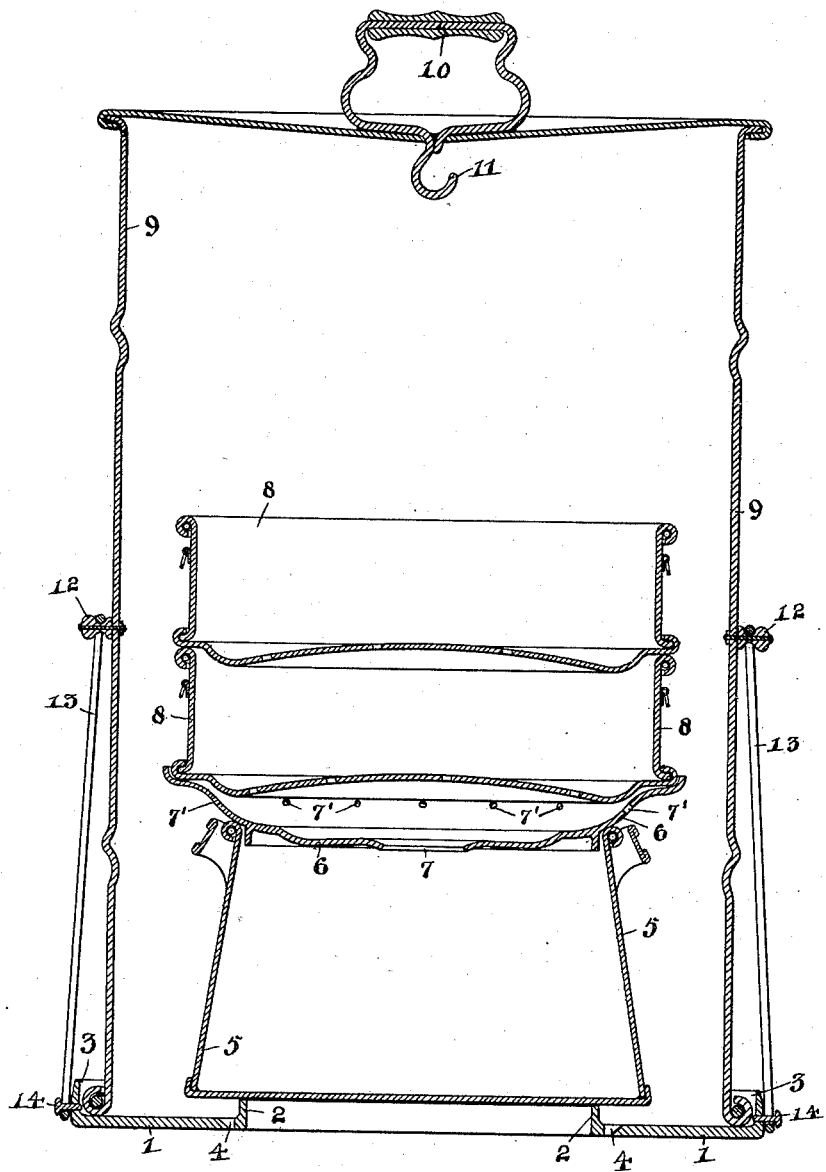
WITNESSES
Arch. M. Catlin.
James Wood
INVENTOR
Richard C Andersen
by
Benj. R. Catlin
atty.
THE NORRIS PETERS CO., PHOTO-LITHO., WASHINGTON, D. C.

UNITED STATES PATENT OFFICE.

RICHARD C. ANDERSEN, OF PAWNEE CITY, ASSIGNOR OF ONE-HALF TO JOHN L. MARSHALL, OF LINCOLN, NEBRASKA.

APPARATUS FOR COOKING BY STEAM.

SPECIFICATION forming part of Letters Patent No. 474,620, dated May 10, 1892.

Application filed July 8, 1891. Serial No. 398,816. (No model.)

*To all whom it may concern:*

Be it known that I, RICHARD C. ANDERSEN, a resident of Pawnee City, in the county of Pawnee and State of Nebraska, have invented certain new and useful Improvements in Apparatus for Cooking by Steam; and I do hereby declare the following to be a full, clear, and exact description of the invention, such as will enable others skilled in the art to which it pertains to make and use the same.

The invention relates to devices for cooking by steam, and has for its object, among others, in apparatus of the class to which the improvement relates, to hinder the escape of steam and of odors, and also to maintain comparatively high degrees of heat and pressure; and it consists in the construction hereinafter described, and pointed out in the claims.

In the accompanying drawing the figure is a vertical section.

Numeral 1 denotes a cast-iron base having two annular rims 2 and 3. The inner rim surrounds an opening of about the size of a stove-top hole.

4 4 indicate a series of apertures through the base just outside of the rim 3. This rim is adapted to support a water-vessel 5, which is contracted toward its top, as represented.

6 indicates a cover provided with an opening 7 at its center and having a series of smaller openings 7' near its circumference, which latter openings are outside of the top of the water-holder when the parts are assembled for use.

8 8 denote cooking-vessels with perforated bottoms and adapted to be supported on cover 6 or on each other, or, if desired, on the water-receptacle.

9 denotes a steam drum or cover adapted to inclose the several vessels and rest upon the base, as indicated. It has a handle 10, the wire of which extends through its top and is then bent into a hook 11, suitable for suspending an article of food or other object. This top is depressed at the center, as shown.

12 12 are wooden knobs or handles secured in the sides of the drum, suitable for lifting it when convenient and affording means for guiding and steadying the drum when handle 10 is used to apply or remove the same. The hooks 13 are secured loosely upon the axes of the knobs 12, and are adapted to engage lugs 14, formed on the base. These hold the drum securely in place whenever they are passed under the lugs.

In operation water is put in vessel 5 and various articles to be cooked in the other vessels. Other articles, if desired, may be put in vessel 5 or suspended from hook 11. The base is placed over a stove-hole or over a gas or other burner. The vessel 5, cover 6, and the other vessels and the drum are assembled, as indicated in the drawing. Steam being produced by sufficient heat ascends through the central opening 7 and through the vessels having perforated bottoms and fills the upper part of the drum and will cook the contents of the various vessels. It will, however, be partially cooled by the operation, and particularly that part of it which comes in contact with the wall of the drum, and will tend to descend toward the base-plate. The latter, as well as vessel 5, being hot will instantly vaporize such partially-condensed steam and convert it into steam of a higher tension, which will ascend again toward the top of the drum through the perforations 7 and through the vessels 8. It will be seen that provision is made for steam circulation within the apparatus, its escape being checked by the repellent effect of the highly-heated base-plate co-operating with the heat of the vessel 5. Under some circumstances the hot gases from the stove or hot air passing under the base-plate may rise through said openings. The base-plate is heated directly by the fire, and its operation, as above set forth, tends to maintain and increase the heat and the tension of the steam within the drum, whereby heat greater than 212° Fahrenheit can be maintained at a pressure above the normal. It will be seen that provision is made for steam circulation within the apparatus, its escape being checked by the repellent effect of the highly-heated base-plate co-operating with the heat of the vessel 5. It has been found by practice that not more than one inch in depth of water will be evaporated per hour from the water-holder, and that no excessive moisture or odor of cooking is perceived in the vicinity. A supply of about three inches in depth will suffice for any ordinary cooking operation without the necessity of replenishing the water-vessel. The drum preferably fits closely within the outer rim of the base-plate, and the knobs 12 are useful in applying said drum to the plate.

Having thus described my invention, what I desire to secure by Letters Patent is—

1. In a steam cooking apparatus, the base-plate having two rims and a central opening and perforations outside and near to the inner rim, in combination with the drum and the water-holder adapted to rest on the inner rim, substantially as set forth.

2. In a steam cooking apparatus, the base-plate having two rims and a central opening and perforations outside and near to the inner rim, in combination with the drum, the water-holder, and the vessels having perforated bottoms, substantially as set forth.

3. In a steam cooking apparatus, the base-plate having two rims and a central opening and perforations outside and near to the inner rim, in combination with the drum, the water-holder, and the vessels having perforated bottoms, the centrally-perforated cover having a series of holes near its periphery, substantially as set forth.

4. In a steam cooking apparatus, a base-plate adapted to rest on a stove and support a water-holder, the water-holder, the centrally-perforated cover having a series of perforations near its periphery, a steaming-vessel adapted to stand on the perforated cover, and an inclosing drum whereby water evaporated on the base-plate can pass as steam through said cover into the steaming-vessel, substantially as set forth.

5. The base-plate having lugs to engage the hooks, the steaming-vessels, the drum provided with knobs on its sides adapted to be used as handles and suitable for the attachment of hooks, and said hooks, all combined substantially as set forth.

6. In a steam cooking apparatus, the drum with a handle, the wire part of said handle being extended through the wall of the drum and bent into a hook adapted to suspend articles, substantially as set forth.

In testimony whereof I have signed this specification in the presence of two subscribing witnesses.

RICHARD C. ANDERSEN.

Witnesses:
D. D. DAVIS,
JOEL DAVID.